United States Patent Office 3,527,762
Patented Sept. 8, 1970

3,527,762
PIPERIDINE DERIVATIVES
David Jack, Alexander Crawford Ritchie, and Dennis George Cheesman, Bethnal Green, London, and Norman James Harper, Gosta Green, Birmingham, England, assignors to Allen & Hanburys Limited, London, England, a British company
No Drawing. Filed Mar. 30, 1966, Ser. No. 538,539
Claims priority, application Great Britain, Apr. 5, 1965, 14,332/65
Int. Cl. C07d 29/30, 29/36
U.S. Cl. 260—293.4
12 Claims

ABSTRACT OF THE DISCLOSURE

Compounds of formula

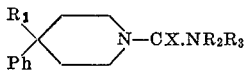

in which the phenyl group may be halogenated, $R_1$ is hydrogen or hydroxy, X is oxygen or sulfur and $R_2$ and $R_3$ are the same or different, may be alkyl or alkenyl or alkoxyphenyl or aralkyl or together with the adjacent nitrogen may form a piperidine ring, have good antitussive activity. Particularly active is 4-phenyl-1-piperidinecarboxamide which is more active than codeine.

---

This invention relates to novel piperidine derivatives having biological activity.

The novel compounds of the present invention are piperidine derivatives of the general formula

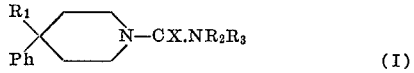

in which Ph is an optionally substituted phenyl radical; $R_1$ is a hydrogen atom or a hydroxy group; X is an oxygen or sulphur atom; $R_2$ and $R_3$ are the same or different and are each a hydrogen atom, an alkyl or alkenyl group each containing up to 5 carbon atoms, optionally substituted aryl group or aralkyl group or $R_2$ and $R_3$ together with the nitrogen atom to which they are both attached form a heterocyclic ring which may contain additional hetero atoms but excluding the case in which X is a sulphur atom and $R_2$ and $R_3$ are both hydrogen atoms.

When Ph is a substituted phenyl radical it is preferably a halogen-substituted phenyl radical.

The present invention also includes a process for the preparation of piperidine derivatives of Formula I which comprises reacting a piperidine derivative of the general formula

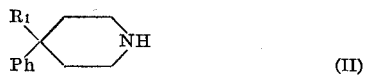

(where Ph and $R_1$ have the meanings given above) with an alkali metal cyanate or thiocyanate, an isocyanate or thioisocyanate of the general formula RNCX (where X has the meaning given above and R is an alkyl or alkenyl group each containing up to five carbon atoms, an optionally substituted aryl group or an aralkyl group) or with a reactive functional derivative of a substituted carbamic or thiocarbamic acid.

Reaction of the piperidine derivatives of Formula II with an alkali metal cyanate produces a 1-carbamylpiperidine. Preferably the alkali metal cyanate is potassium cyanate, and the reaction is carried out in the presence of an acid. For instance the reactants may be heated in an acid such as acetic acid which also acts as a solvent for carrying out the reaction. Alternatively the potassium cyanate may be reacted with an acid addition salt of the piperidine derivative of Formula II in an inert solvent such as ethanol.

Examples of isocyanates and thioisocyanates which may be used are ethyl isocyanate, the butylisocyanates, phenyl isocyanate, p-methoxyphenyl isocyanate, allyl isothiocyanate and phenyl isothiocyanate.

Examples of reactive functional derivatives of substituted carbamic acids which may react with the piperidine derivative of Formula II include substituted carbamyl chlorides such as N-methyl-carbamyl chloride, N,N-dimethylcarbamyl chloride and N,N-diethylcarbamyl chloride.

Some of the compounds of the present invention may be prepared by an alternative process of the present invention in which a reactive functional derivative of a 1-piperidine carboxylic or thiocarboxylic acid is condensed with the appropriate primary or secondary amine of the general formula $NHR_2R_3$, wherein $R_2$ and $R_3$ have the meanings given above. Preferably the reactive functional derivative is a 1-piperidine carboxylic or thiocarboxylic acid chloride which may be prepared by reacting the piperidine derivative of Formula II with phosgene or thiophosgene.

The novel piperidine derivatives of Formula I have useful biological activity, for example antitussive activity, and they may be employed in the usual forms for therapeutic administration. For example, they may be formulated with a pharmaceutical carrier or excipient to provide tablets, capsules, suppositories or injection solutions.

The following examples illustrate the invention.

EXAMPLE 1

Preparation of 4-phenyl-1-piperidinecarboxamide 9.9 g. of 4-phenylpiperidine hydrochloride, 16.2 g. of potassium cyanate and 250 ml. of ethanol were heated at the reflux temperature for 1½ hours. The mixture was cooled to room temperature and the inorganic solid present was removed by filtration. The filtrate was concentrated under reduced pressure and the residual solid was recrystallised from a mixture of 35 ml. of isopropanol and 80 ml. of isopropyl acetate to give the product as white platelets, M.P. 176° C.

EXAMPLE 2

Preparation of 4-(4-chlorophenyl)-1-piperidine-carboxamide 11.6 g. of 4-(4-chlorophenyl)piperidine hydrochloride was dissolved in a mixture of 25 ml. of glacial acetic acid and 50 ml. of water and the solution was warmed to 35° C. 16.2 g. of potassium cyanate in 30 ml. of water was warmed to 35° C. and added to the previous solution and the mixture was stirred at room temperature for two hours. The precipitated solid was removed by filtration, washed with water and recrystallised from a mixture of 150 ml. of water and 60 ml. of ethanol to give the product as a white solid, M.P. 148° C.

EXAMPLE 3

Preparation of 4-hydroxy-4-phenyl-1-piperidine-carboxamide 10.7 g. of 4-phenyl-4-piperidinol hydrochloride was dissolved in a mixture of 25 ml. of glacial acetic acid and 50 ml. of water and the solution was warmed to 45° C. 16.2 g. of potassium cyanate in 30 ml. of water was warmed to 45° C. and added to the previous solution and the mixture was stirred at room temperature for two hours. The resulting precipitate was removed by filtration, washed with water and recrystallised from a mixture of 40 ml. of water and 2 ml. of ethanol to give the product as a white solid, M.P. 144° C.

EXAMPLE 4

Preparation of N-ethyl-4-phenyl-1-piperidine-carboxamide

2.2 ml. of ethyl isocyanate was added dropwise to a stirred and cooled solution of 6.6 g. of 4-phenylpiperidine in 25 ml. of chloroform. When the vigorous exothermic reaction had ceased, the chloroform was removed by distillation, leaving 8.7 g. of a viscous oil which solidified. This was recrystallised from 25 ml. of isopropyl acetate, giving 6.2 g. of white needles, M.P. 100–101° C.

EXAMPLE 5

Preparation of N-butyl-4-phenyl-1-piperidine-carboxamide

4.95 g. of n-butyl isocyanate in 25 ml. of chloroform was added to 8.05 g. of 4-phenylpiperidine in 35 ml. of chloroform, and the mixture was heated at gentle reflux for 2 hours. Thin layer chromatography (silica/methanol) showed a new spot at Rf 0.8. The mixture was cooled and was extracted with dilute hydrochloric acid to remove unreacted 4-phenylpiperidine. The chloroform was removed by distillation and the residual oil was crystallised from 50 ml. of isopropyl acetate to give 5.1 g. of a white crystalline solid M.P. 104° C.

EXAMPE 6

Preparation of 4-phenyl-1-piperidinecarboxanilide

7.4 g. of phenyl isocyanate was added to 10 g. of 4-phenylpiperidine in 50 ml. of chloroform. The mixture was cooled and stirred during the addition. The solvent was removed by distillation leaving 13.7 g. of a pale brown solid, which was crystallised from 75 ml. of ethanol giving 12.0 g. of white platelets M.P. 162.3° C.

EXAMPLE 7

Preparation of 4-phenyl-1-piperidinecarbox-p-anisidide

9.25 g. of p-methoxyphenyl isocyanate was added dropwise to a stirred and cooled solution of 10 g. of 4-phenylpiperidine in 50 ml. of chloroform. When the vigorous exothermic reaction had ceased, the solvent was removed by distillation and the 15.5 g. of residual brown solid was recrystallised from 50 ml. of ethanol giving 13.6 g. of white needles M.P. 148° C.

EXAMPLE 8

Preparation of N,N-diethyl-4-phenyl-1-piperidine-carboxamide

4.5 g. of N,N-diethylcarbamoyl chloride in 10 ml. of chloroform was added to a stirred mixture of 5.3 g. of 4-phenyl piperidine and 3.5 ml. of triethylamine in 30 ml. of chloroform. When the vigorous exothermic reaction had ceased, the mixture was cooled and was washed first with dilute hydrochloric acid and then with water. The chloroform was removed by distillation leaving a brown oil, which was distilled under reduced pressure to give 4.5 g. of a colourless liquid, B.P. 152° C. at 0.3 mm. Hg, $n_D^{27}$ 1.5311.

EXAMPLE 9

Preparation of 4-phenyl-1,1¹-carbonyldipiperidine

7.4 g. of piperidine-carbonyl chloride in 20 ml. of chloroform was added dropwise to 8.0 g. of 4-phenyl piperidine in 60 ml. of chloroform and 10.0 g. of triethylamine. When the exothermic reaction had ceased, the mixture was heated at gentle reflux for 1 hour. The solution was cooled and was extracted with dilute hydrochloric acid, and was then washed with water. The chloroform solution was examined by thin layer chromatography (silica/methanol) and was found to contain a substance Rf ca. 0.8 in addition to some 4-phenyl-piperidine. The solvent was removed by distillation to leave 10.4 g. of a yellow oil which solidified. The solid was recrystallised from water to give 9.7 g. of a creamy solid M.P. 78–79° C.

EXAMPLE 10

Preparation of N-allyl-4-phenyl-thio-piperidinecarboxamide

4.95 g. of allyl isothiocyanate in 10 ml. of chloroform was added to 8.05 g. of 4-phenyl piperidine in 40 ml. of chloroform. The mixture was cooled and was extracted with dilute hydrochloric acid to remove unreacted 4-phenylpiperidine and was then washed with water. The chloroform was examined by thin layer chromatography (silica/methanol) and was found to be a single spot, Rf ca. 0.9. The solvent was removed by distillation and the residual oil was triturated with petroleum ether. The resultant solid after recrystallisation from aqueous alcohol yielded off 2.1 g. of white crystals, M.P. 82.5–83.5° C.

EXAMPLE 11

Preparation of 4-phenyl-thio-1-piperidinecarboxanilide

4.5 g. of phenyl isothiocyanate in 10 ml. of chloroform was added to 6.4 g. of 4-phenylpiperidine in 25 ml. of chloroform. The mixture was heated at gentle reflux for one hour, when thin layer chromatography (silica/methanol) showed the complete disappearance of the starting material and the appearance of a new spot at Rf. 0.8. The chloroform was removed by distillation, leaving 14.6 g. of an off-white solid which was recrystallised from 50 ml. of ethanol to give 9.0 g. of white crystals M.P. 128–129° C.

The preferred compound of the present invention is 4-pheyl-1-piperidinecarboxamide (referred to in the tests below as AH.1932). This compound possesses good antitussive activity as is shown below in tests on the conscious guinea pig.

Antitussive activity in the conscious guinea pig

AH.1932 was shown to possess marked activity against the coughing induced in the conscious guinea pig by inhalation of ammonia and sulphur dioxide vapours. In both tests, AH.1932 was shown to possess greater activity than codeine. Comparative ED.50 values are given in the table below.

| Compound | Oral ED⁵⁰ mg./kg. to suppress coughing induced by— | |
|---|---|---|
|  | Ammonia | Sulphur dioxide |
| AH.1932 | 28.5 | >50 |
| Codeine | 46.5 | >50 |

In the ammonia test, the activity of AH.1932 was shown to be of longer duration than codeine.

What is claimed is:

1. A piperidine derivative of formula

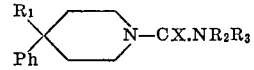

in which Ph is a member selected from the group consisting of monohalogenated phenyl and unsubstituted phenyl, $R_1$ is a member selected from the group consisting of hydrogen and hydroxy, X is oxygen or sulphur, $R_2$ and $R_3$ are each a member selected from the group consisting of hydrogen, alkyl groups containing up to 5 carbon atoms, alkenyl groups containing up to 5 carbon atoms, phenyl and methoxyphenyl or $R_2$ and $R_3$ together with the nitrogen atom to which they are both attached form a mononuclear nitrogen containing 6 numbered heterocyclic piperidine ring and wherein when X is sulfur at least one of $R_2$ and $R_3$ is other than hydrogen.

2. A compound according to claim 1 which is 4-phenyl-1-piperidinecarboxamide.

3. A compound according to claim 1 which is 4-(4-chlorophenyl)-1-piperidinecarboxamide.

4. A compound according to claim 1 which is 4-hydroxy-4-phenyl-1-piperidinecarboxamide.

5. A compound according to claim 1 which is N-ethyl-4-phenyl-1-piperidinecarboxamide.

6. A compound according to claim 1 which is N-butyl-4-phenyl-1-piperidinecarboxamide.

7. A compound according to claim 1 which is 4-phenyl-1-piperidinecarboxanilide.

8. A compound according to claim 1 which is 4-phenyl-1-piperidinecarbox-p-anisidide.

9. A compound according to claim 1 which is N,N-diethyl-4-phenyl-1-piperidinecarboxamide.

10. A compound according to claim 1 which is 4-phenyl-1,1¹-carbonyldipiperidine.

11. A compound according to claim 1 which is N-allyl-4-phenyl-thio-piperidinecarboxamide.

12. A compound according to claim 1 which is 4-phenyl-thio-1-piperidinecarboxanilide.

References Cited

UNITED STATES PATENTS

| | | | |
|---|---|---|---|
| 2,937,180 | 5/1960 | Janssen | 260—294 |
| 3,117,139 | 1/1964 | Mooradian | 260—294.3 |
| 3,350,403 | 10/1967 | Biel et al. | 260—294 |
| 3,350,404 | 10/1967 | Hopps | 260—294 |

JAMES A. PATTEN, Primary Examiner

U.S. Cl. X.R.

260—294; 424—867